United States Patent

[11] 3,592,508

| [72] | Inventor | Frederick Druseikis |
| | | Kettering, Ohio |
| [21] | Appl. No. | 2,862 |
| [22] | Filed | Jan. 14, 1970 |
| [45] | Patented | July 13, 1971 |
| [73] | Assignee | General Motors Corporation |
| | | Detroit, Mich. |

[54] POWER ACTUATED HEADREST ASSEMBLY
4 Claims, 6 Drawing Figs.

| [52] | U.S. Cl. | 297/410 |
| [51] | Int. Cl. | A47c 7/36 |
| [50] | Field of Search | 297/410, |
| | 397, 353, 330, 348; 182/40, 41, 208 |

[56] References Cited
UNITED STATES PATENTS

| 2,961,060 | 11/1960 | Taylor | 182/40 |
| 2,985,229 | 5/1961 | Shamblin | 297/410 |
| 3,017,780 | 1/1962 | Kienhofer | 297/410 |
| 3,311,413 | 3/1967 | Martens | 297/410 |
| 3,385,397 | 5/1968 | Robinsky | 182/41 |
| 3,427,073 | 2/1969 | Downs | 297/410 |
| 3,462,193 | 8/1969 | Tamura | 297/410 |

*Primary Examiner*—Francis K. Zugel
*Attorneys*—J. L. Carpenter, E. J. Biskup and Peter D. Sachtjen ABSTRACT: A power actuated headrest assembly for a motor vehicle includes a headrest having a downwardly extending support member that slidingly engages a guide member carried interior of a seat back. A plastic tape extends along the support member and has a lower end connected to the guide member and a free upper end that extends into the headrest. An electric motor carried by the headrest includes gear means that drivingly engage the tape for selectively vertically moving the headrest relative to the seat back with the tape serving as a columnar load bearing member.

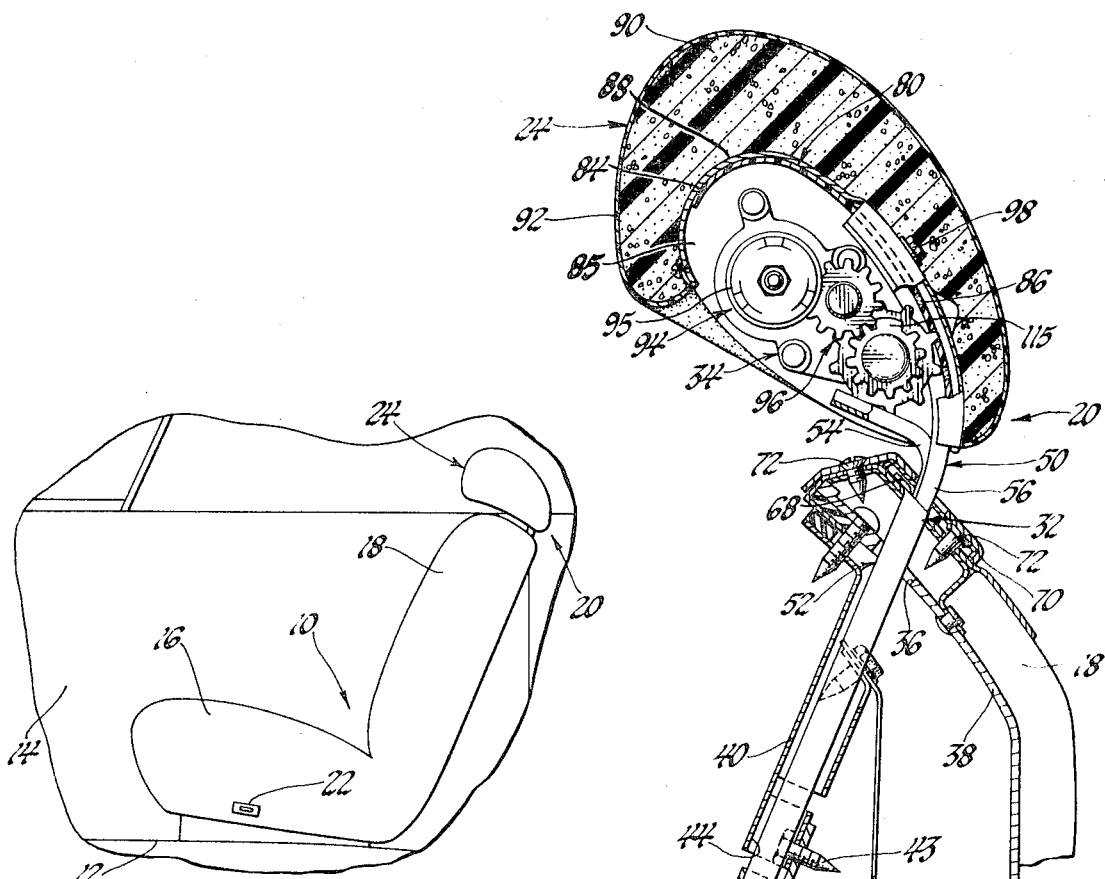

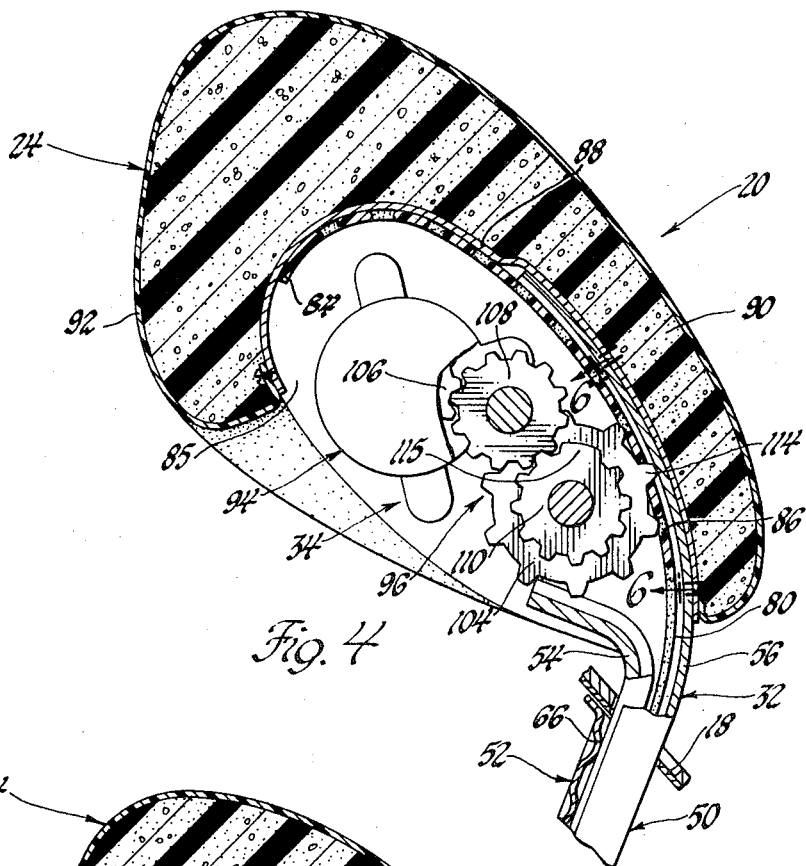
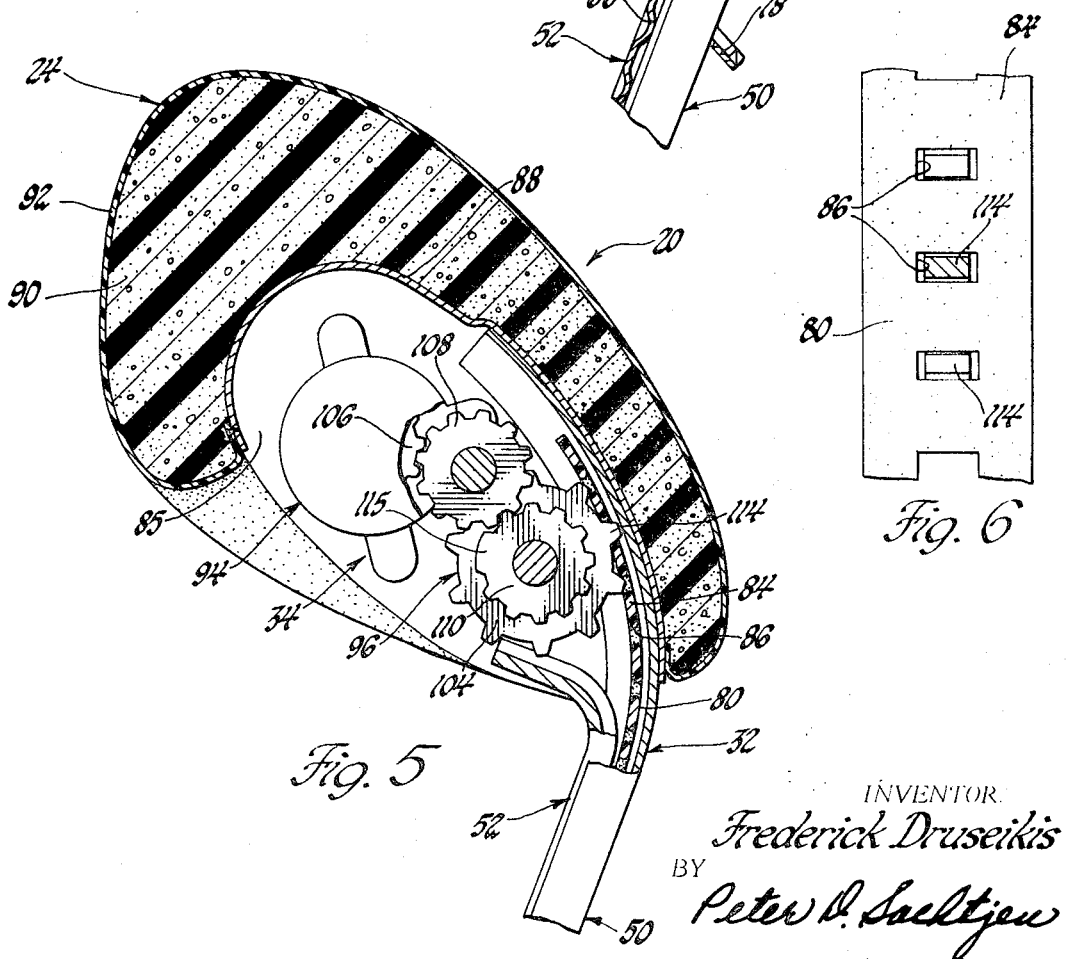

POWER ACTUATED HEADREST ASSEMBLY

This invention relates to headrest assemblies and, in particular, a headrest for a motor vehicle that is selectively positionable at a desired distance above a seating unit on which it is supported.

Currently, headrests are being offered as original equipment on most motor vehicles as an aid for increasing seating comfort and reducing driving fatigue. To fully realize the beneficial aspects of the headrest, a suitable adjusting arrangement should be provided so that individuals of differing heights and seating preferences can select a headrest position best suited to their individual needs. This objective of selective vertical adjustability is most easily obtained by telescoping the headrest support member within a complementally formed casing or sleeve mounted interior of the seat back and incorporating manual locking means for maintaining the headrest at a desired position. The locking means may take various conventional forms such as manually operable thumb screws, cooperating spring biased balls and spherical depressions, or cantilevered springs engaging notches in the support member.

While these arrangements fully serve their intended purpose, it has been recognized that a headrest which is power actuated and selectively positionable in an infinite number of locations above the seat back might be offered as optional equipment. Heretofore, these constructions have proposed using an electric motor carried interior of the seat back for operatively driving the headrest to the desired position through a suitable mechanism. Whether the actuating mechanism took the form of endless cables, drive wheels, rack and pinion drives, rotatable actuators, or the like, extensive modifications to the basic seating unit construction were required to accommodate these arrangements. Thus far, the attendant disadvantages of these constructions greatly reduced the feasibility of offering power-actuated headrests as optional equipment.

The present invention contemplates providing a power-actuated headrest assembly which is interchangeable with the aforementioned manually operated headrest assembly without requiring any modifications of the basic seating unit. Generally, this objective is achieved by mounting the headrest support assembly directly into the mounting sleeve for the manual headrest. To avoid redesigning the interior of the seat back, the headrest actuator means constitute an integral part of the assembly. More specifically, an elongated flexible drive tape is fixed at a lower end to a guide member carried by the conventional mounting sleeve in the seat back. The drive tape has a notched free end that extends upwardly into the headrest. A support bar attached to the headrest slidably engages the guide member for accommodating extensible movement between the headrest and the seat back. The teeth of an output gear operatively connected to the motor successively engage the notched portion of the tape. Upon energization of the motor, the output gear traverses the free end of the tape thereby varying the distance between the fixed end and the headrest. This relative movement, in turn, causes the headrest to shift in an opposite direction with the tape being columnarly loaded. The drive tape, in this manner, serves as a primary load bearing member for supporting the weight of the headrest and associated driving mechanism under both dynamic and static conditions. Thus, it will be appreciated that inasmuch as the guide member, support member, headrest, and motor constitute an assembled unit prior to mounting in the seat back, the present invention may be easily adapted to the seat back without requiring modifications to the basic seating unit.

Accordingly, an object of the present invention is to provide a power-actuated headrest which is interchangeable with a manually operated headrest so as to avoid structural modification of the seating unit on which it is incorporated.

Another object of the present invention is to provide a headrest assembly for a seating unit wherein actuator means carried by the headrest operatively cooperate with tape means fixed relative to the seating unit for selectively positioning the headrest relative to the latter.

Still another object of the present invention is to provide a headrest assembly for a motor vehicle seat back wherein a flexible tape mounted interior of the seat back has a free end that is drivingly engaged by a motor means carried by the headrest, the arrangement being such that upon actuation of the motor means, the headrest is shifted along the tape with the latter acting as a load bearing member.

A further object of the present invention is to provide a power-actuated headrest assembly for a motor vehicle seat back wherein a support extending downwardly from the headrest slidably engages a guide member carried interior the seat back, and a load bearing tape having one end fixed to the guide member and a free end projecting upwardly into the headrest is drivingly engaged by a gear set operatively driven by an electric motor carried interior of the headrest, whereby actuation of the motor shifts the free end of the tape relative to the headrest thereby causing the latter to move in the opposite direction with the tape acting as a load bearing member.

These and other objects will be apparent to one skilled in the art upon reading the following detailed description, reference being made to the accompanying drawings in which:

FIG. 1 is a side elevational view of a motor vehicle seating unit incorporating a power-actuated headrest assembly made in accordance with the present invention;

FIG. 2 is an enlarged cross-sectional view of the seat back and the headrest assembly shown in FIG. 1;

FIG. 3 is an enlarged view taken along line 3-3 of FIG. 2;

FIG. 4 is an enlarged partially sectioned view showing the headrest in a lowered position;

FIG. 5 is a view similar to FIG. 4 showing the headrest in an extended position; and, FIG. 6 is an enlarged view taken along line 6-6 of FIG. 4.

Referring to FIG. 1, a seating unit 10 is mounted on a floor panel 12 of a motor vehicle 14. The seating unit 10 includes a horizontal seating cushion 16 attached on the floor panel 12 and an upwardly projecting seat back 18. A power-actuated headrest assembly 20, made in accordance with the present invention, is mounted adjacent the upper portion of the seat back 18. A switch 22 carried at the side of the seating cushion 16 is selectively actuated for locating a headrest 24 in an infinite number of vertical positions relative to the seat back 18.

Referring to FIG. 2, the headrest assembly 20 generally comprises a support assembly 32, the headrest 24, and power actuator means 34. The support assembly 32 projects downwardly into the interior of the seat back 18 through a slot 36 formed in the seat back frame 38. A pair of rearwardly facing, generally U-shaped mounting sleeves 40 and 42 are fixed to the frame 38 by fasteners 43. The mounting sleeves 40 and 42 define a generally vertically extending sleeve cavity 44 which registers with the slot 36. As contemplated in the preferred embodiment, the sleeve cavity 44 is adapted to interchangeably receive either the present power-actuated headrest assembly 20 or any of the manually adjustable headrest assemblies currently in use on motor vehicles.

Referring to FIG. 3, the support assembly 32 includes a support member 50 and an elongated, generally U-shaped guide sleeve or channel 52. The support member 50 includes a front channel 54 and a rear channel 56. The channels 54 and 56 are structurally connected by welded seams 58 to form an interior longitudinal passageway 60. The guide sleeve 52 includes a pair of laterally spaced sidewalls 62 interconnected by an integral base wall 64. A plurality of longitudinally spaced spherical bearing pads 66 are formed on the base wall 64. The lower front surface of the channel 54 slidingly engages the pads 66 and, in combination with the sidewalls 62, extensibly guides the support member 50 for controlled vertical movement relative to the seat back 18.

As shown in FIG. 2, a forwardly projecting lip 68 is formed at the upper end of the guide sleeve 52. The lip 68 is clamped between the seat back frame 38 and a cover plate 70 by means of fasteners 72 to thereby fixedly secure the guide sleeve 52 relative to the seat back 18. A generally U-shaped tape guide 74 is fixedly connected to the base wall 64 interior of the passageway 60.

Referring to FIGS. 2 through 5, an elongated drive tape 80 formed of a longitudinally stiff, columnarly loadable plastic material such as nylon extends vertically through the passageway 60. In assembly, the drive tape 80 is slightly flexible and is restrained against buckling by the guide 74 and the front surface of the channel 56 to thereby statically and dynamically support the headrest 24 at a desired vertical position in the manner described below. The lower end 81 of the tape 80 is fixed to sleeve 52 by a rivet 82. The upper end 84 projects freely upwardly above the top of the seat back 18 into a downwardly opening pocket 85 formed in the headrest 24. As shown in FIG. 6, a longitudinally spaced series of notches 86 are formed in the upper end 84 of the tape 80.

The headrest 24 includes a curved sheet metal reinforcing plate 88, the inner surface of which defines the aforementioned pocket 85. The reinforcing plate 80 is attached to the forwardly turned upper end of the channel 56 by any suitable means such as welding. A foam padding 90 and a contoured resilient outer covering 92 overlie the reinforcing plate 88. In a customary manner, the headrest 24 serves as a cushion or restraint pad for the head of an occupant of the seating unit 10.

The power actuator means 34 generally comprises a conventional bidirectional direct current electric motor 94, a belleville spring slip clutch 95, and a gear set 96. The power actuator means 34 are directly carried in the pocket 85 and fixedly attached to the reinforcing plate 88 by a fastener 98. A pair of lead wires 100 and 102 extend through the passageway 60 and are electrically connected between the motor 94 and the switch 22, which is of a conventional double pole, double throw construction and serves to reverse rotation of the motor 94. The switch 22 is suitably electrically connected to a power source such as the vehicle battery. The gear set 96 includes an output gear 104 that is operatively connected to the motor 94 by intermediate gears 106, 108, and 110. The teeth 114 of the output gear 104 are adapted to drivingly engage the tape 80 by successively engaging the sides of the notches 86. A stop member 115 is located between the teeth of the gear 110 and coacts with the teeth of the gear 108 to lock the gear set 96 and limit travel of the headrest assembly 20 within the confines of the notches 86. The clutch 95 prevents stalling of the motor 94 under these conditions.

In operation, to raise the headrest 24 from the retracted position shown in FIG. 4, the motor 94 is appropriately energized through the switch 22 to rotate the gear 106 in a clockwise direction. This, in turn, drives the output gear 104 clockwise whereby the teeth 114 drivingly engage the sides of the notches 86. Consequently, the actuator means 34 traverse the free end 84 thereby shifting the tape 80 downwardly with respect to the reinforcing plate 88. However, inasmuch as the lower end 81 of the tape 80 is fixed relative to the guide sleeve 52 and the seat back 18, the headrest 24 will be forced in an opposite direction. This movement will then shift the headrest 24 steadily upwardly within the limits of the notches 86 until the switch 22 is released. Thus, it will be appreciated that during dynamic operating conditions the tape 80 acts as a vertical load bearing member to support the headrest 24 and the support assembly 32. Furthermore, unless supplemental locking means are incorporated in the assembly, the drive tape 80 will also statically support the headrest in the desired position. To lower the headrest 24 from the extended position shown in FIG. 5, the direction of motor rotation is reversed thereby rotating the output gear 104 in a counterclockwise direction and causing the actuator means 34 and the headrest 24 to travel downwardly along the free end 84 of the tape 80.

Although only one form of this invention has been shown and described, other forms will be readily apparent to those skilled in the art. Therefore, it is not intended to limit the scope of this invention by the embodiment selected for the purpose of this disclosure but only by the claims which follow.

What I claim is:

1. A headrest assembly for a seat back, comprising: a headrest having support means extending therefrom; guide means for said support means adapted to be carried interior of the seat back for allowing controlled relative movement between the latter and the headrest; tape means of a columnarly loadable material for supporting said headrest as predetermined positions with respect to the guide means, said tape means having a lower end adapted to be secured relative to the seat back and an upwardly projecting free end; actuator means carried with the headrest and operatively engaging said free end of said tape means for driving said headrest relative to said free end to thereby selectively vertically position the headrest relative to the guide means and the seat back.

2. A power-actuated headrest assembly for a motor vehicle seating unit having a seat back, comprising: a headrest; a support member extending from said headrest; a guide member adapted to be carried interior of the seat back, said guide member slidingly engaging said support member to provide controlled extensible movement therebetween; an elongated tape of a longitudinally stiff material extending along the support member, said tape having one end fixedly connected to the guide member and a free end projecting to the headrest; motor means carried with the headrest and operatively engaging the tape for moving the headrest relative to the seat back whereby the tape serves as a columnar load bearing member for vertically supporting the headrest during dynamic operation.

3. A headrest assembly for a seating unit having a seat back, comprising: a headrest; actuator means including an output gear operatively carried with the headrest, said output gear being bidirectionally rotatable upon selective energization of said actuator means; a guide member adapted to be carried interior of the seat back; a support member connected to the headrest, having an end portion slidably engaging the guide member for controlled extensible movement; an elongated flexible load bearing tape having one end fixed relative to the guide member and the seat back, and a free end projecting to the headrest; a series of openings formed in said free end of said tape, the sides of said openings being operatively engaged by the teeth of said output gear, whereby energization of said actuator means imparts rotation to said output gear and causes the latter to operatively traverse said free end of said tape thereby varying the relative distance between the headrest and the guide member and selectively positioning the headrest at a desired vertical height.

4. A power-actuated headrest assembly for a motor vehicle seating unit having a seat back, comprising: a headrest including a curved reinforcing plate defining a downwardly opening pocket; a support member attached to the reinforcing plate and extending downwardly from said headrest: a guide sleeve adapted to be mounted interior of the seat back and having spaced surfaces serving to guide the support member for vertical extension with respect to the seat back; an elongated drive tape of a longitudinally stiff load bearing material, said drive tape having a lower end fixed to the guide sleeve and a free end projecting upwardly into said pocket of said headrest; a series of longitudinally spaced gear-tooth receiving notches formed in said free end of said drive tape; an electric motor located in said pocket and fixedly attached to the reinforcing plate; means including switch means for selectively energizing said electric motor; gear means operatively connected to the electric motor including an output gear having teeth drivingly engaging said notches whereby energization of the electric motor imparts rotation to said output gear and causes said teeth to successively engage the next adjacent notch thereby shifting said headrest upwardly with respect to said drive tape to vary the relative distance between the electric motor and said guide sleeve and selectively position said headrest with respect to the seat back.